(12) United States Patent
Gadgil

(10) Patent No.: US 6,464,884 B1
(45) Date of Patent: Oct. 15, 2002

(54) PORTABLE WATER TREATMENT UNIT

(75) Inventor: Ashok J. Gadgil, El Cerrito, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/648,320

(22) Filed: Aug. 25, 2000

Related U.S. Application Data
(60) Provisional application No. 60/151,226, filed on Aug. 26, 1999.

(51) Int. Cl.⁷ .................................................. C02F 1/32
(52) U.S. Cl. .................. 210/748; 210/787; 210/806; 210/807; 210/241; 210/258; 210/259; 210/295; 210/314; 210/323.1; 210/324; 210/416.1; 210/473; 422/24; 422/186.3
(58) Field of Search ................................ 210/748, 767, 210/787, 806, 807, 241, 252, 258, 259, 295, 314, 323.1, 324, 416.1, 473; 422/24, 186.3

(56) References Cited

U.S. PATENT DOCUMENTS

| | | | |
|---|---|---|---|
| 3,630,365 A | 12/1971 | Woodbridge et al. ....... 210/152 |
| 4,169,789 A | * 10/1979 | Lerat |
| 4,229,202 A | * 10/1980 | Mullerheim et al. |
| 4,659,460 A | 4/1987 | Muller et al. .................. 210/93 |
| 4,664,798 A | 5/1987 | Bergh ......................... 210/241 |
| 5,004,535 A | 4/1991 | Bosko et al. ................. 210/90 |
| 5,104,525 A | 4/1992 | Roderick ...................... 210/87 |
| 5,324,425 A | 6/1994 | Ellison ........................ 210/167 |
| 5,384,032 A | * 1/1995 | De Souza |
| 5,399,260 A | 3/1995 | Eldredge et al. ............... 210/87 |
| 5,484,538 A | * 1/1996 | Woodward |
| 5,547,584 A | 8/1996 | Capehart ..................... 210/669 |
| 5,622,622 A | 4/1997 | Johnson ...................... 210/192 |
| 5,632,892 A | 5/1997 | Klein ........................ 210/257.2 |
| 5,643,443 A | 7/1997 | Ishikura ...................... 210/113 |
| 5,653,877 A | 8/1997 | Mark .......................... 210/259 |
| 5,741,416 A | 4/1998 | Tempest, Jr. .................. 210/90 |
| 5,776,346 A | 7/1998 | Fukai .......................... 210/663 |
| 5,824,215 A | 10/1998 | Suh ............................. 210/249 |
| 5,997,737 A | * 12/1999 | Sturdevant et al. |
| 6,089,420 A | 7/2000 | Rodriguez |
| 6,120,691 A | * 9/2000 | Mancil |

* cited by examiner

Primary Examiner—Betsey Morrison Hoey
(74) Attorney, Agent, or Firm—Knobbe, Martens, Olson & Bear LLP

(57) ABSTRACT

A portable water treatment unit is provided for purifying contaminated water, especially in the aftermath of a natural disaster that compromises a region's water supply. The treatment unit is configured to treat water drawn into the unit. The treatment unit comprises an inlet connected to a pump. The pump outlet is connected to a solid separator for removing larger particles such as sand and silt. A series of filters is connected to the pump outlet, the filters being arranged from coarsest to finest. The filters remove smaller particles from the water. The water from the filters eventually flows into an ultraviolet light disinfection unit configured to purify water by emitting ultraviolet light thereon. An outlet of the UV light disinfection unit is configured to expel purified water for drinking and other uses. Pressure gages are provided for monitoring the pressure drops across the filters. A flow meter is provided for monitoring the flow into the UV light disinfection unit, to ensure adequate UV disinfection. The entire treatment unit is preferably provided within a cart with wheels.

35 Claims, 3 Drawing Sheets

PORTABLE WATER TREATMENT UNIT

RELATED APPLICATION

This application claims priority under 35 U.S.C. §119(e) from U.S. Provisional Patent Application Ser. No. 60/151,226, entitled "LIGHTWEIGHT, COMPACT EMERGENCY RELIEF UNIT FOR PROVIDING DRINKING WATER," filed on Aug. 26, 1999. This application also hereby incorporates by reference, in its entirety, the same.

BACKGROUND OF THE INVENTION

1. Field of the Invention

This invention relates generally to water treatment and more particularly to a portable water treatment unit for purifying contaminated water.

2. Description of the Related Art

After a natural disaster has disrupted, severely damaged, or destroyed the physical infrastructure of a village or town, waterborne diseases often present the greatest risk to human health. This happens in both developed and developing world settings. Water supplies in these situations may be biologically contaminated by sewage effluents that mix with floodwaters, or physically contaminated with mud and soil that enter the water supply and hinder disinfection efforts. Harmful chemicals (e.g., nitrates and pesticides) are also typically found in flood water under such conditions, in addition to waterborne pathogens.

Contaminated water may be characterized as having a "biological load" and a "physical load." The biological load of the water refers to the level of biological contaminants in the water. The physical load of the water refers to the total level of suspended solids, dissolved solids, organic carbon, and turbidity in the water.

It is sometimes desirable to disinfect contaminated water for drinking and other uses. For example, after a natural disaster a region's water supply may be compromised, necessitating emergency water treatment. It has long been known to disinfect water by exposing it to ultraviolet ("UV") light, which kills contaminants in the water. In fact, disinfection devices that utilize UV light for purifying water have been used since the early 1900's. Typically, the "UV light disinfection unit" or device is configured to receive a stream of water. The device normally includes a UV light exposure chamber, through which the stream flows and is purified by exposure to a UV lamp. One particularly effective UV light disinfection device is described in U.S. Pat. No. 5,780,860 to Gadgil et al. (hereinafter "Gadgil '860"), which is hereby incorporated herein by reference, in its entirety. The Gadgil disinfection unit is herein referred to as the "UV Waterworks™ unit."

Most UV light disinfection devices are designed for purification of water having a relatively low physical load. In order to treat water having a larger physical load, some water treatment units combine the UV light disinfection device with one or more filters for removal of particles from the water. Unfortunately, the filters tend to clog over time, and must be replaced periodically.

SUMMARY OF THE INVENTION

Accordingly, it is a principle object and advantage of the present invention to provide an improved device for purifying water, especially in the aftermath of a natural disaster or broken water main that has compromised a region's water supply. Another object is to provide a device for emergency on-site treatment of contaminated water.

In particular, one aspect of the invention provides a portable water treatment unit that purifies contaminated water so that it is safe for drinking and other uses. In a preferred embodiment, the treatment unit weighs less than 100 kg (220 lbs) and occupies a volume of no more than approximately one cubic meter (30 cubic feet).

According to one aspect of the invention, biological and physical contaminants are efficiently removed from water by an appropriate combination of solid separators, filters, and UV disinfection. A solid separator, such as a hydrocyclone, removes larger particles from the water, such as silt and sand. The filters generally remove smaller particles. The use of the solid separator(s) reduces the tendency of the filters to become clogged. Advantageously, filter replacements are reduced by 20–80%. A pump is preferably included to help force the water to flow through the solid separator and filters. Preferably, a UV light disinfection unit, such as the UV Waterworks™ unit, is provided downstream of the filters. For ease of transportation, some or all of the treatment unit components may be provided in or on a cart with wheels.

In one aspect, the present invention provides a water purification system configured to purify water, comprising an inlet configured to receive water, a solid separator, one or more filters, and an ultraviolet light disinfection unit. The solid separator is connected so as to receive water that has flown into the system through the inlet. The solid separator is configured to separate solids from water flowing through the solid separator. The one or more filters are connected in series, the filters being connected so as to receive water that has flown through the solid separator. The ultraviolet light disinfection unit is connected so as to receive water that has flown through the one or more filters. The ultraviolet light disinfection unit is configured to treat water flowing therein by irradiating the water with ultraviolet light.

In another aspect, the present invention provides a water treatment unit configured to purify water, comprising an inlet configured to receive water, a solid separator, and an ultraviolet light disinfection unit. The solid separator is connected so as to receive water that has flown into the treatment unit through the inlet. The solid separator is configured to separate solids from water flowing through the solid separator. The ultraviolet light disinfection unit is connected so as to receive water that has flown through the solid separator. The ultraviolet light disinfection unit is configured to treat the water by emitting ultraviolet light through the flowing water. The water treatment unit weighs 100 kg or less.

In yet another aspect, the present invention provides a method of purifying water, comprising the following: A flow of water is provided. The flow of water is directed through a solid separator configured to separate solids from the flow of water. The flow of water is directed through a series of one or more filters connected in series, the filters being arranged from coarsest to finest. The flow of water is directed through a UV disinfector configured to emit UV light onto the flow of water.

Despite its small size and weight, giving the unit the advantage of portability, the illustrated unit has the capacity to produce up to 15 L/min of drinking water from highly turbid and contaminated challenge water, enough to fill the needs of about 1000 people. At the same time, the unit is capable of reducing total coliform concentrations of 100,000–1,000,000 colony forming units (CFUs) per 100 ml to less than 1 CFU per 100 ml.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

DETAILED DESCRIPTION OF THE PREFERRED EMBODIMENT

Overview

The portable water treatment unit of the present invention is designed to treat a variety of different post-disaster water conditions. For example, the unit can treat contaminated water resulting from a ruptured or compromised water supply line, characterized by having a high biological load (as a result of potential raw sewage contamination) and a relatively low physical load. Alternatively, the unit can treat surface floodwater, characterized by a high physical load and a relatively low biological load. Between these extremes, the unit can treat an intermediate dilution of biological and physical loads, as well as a dilution of intermediate biological load and high physical load.

Thus, the portable water treatment unit of the present invention provides both physical and biological treatment. Physical treatment uses three different technologies: screening, solid separation, and filtration. Biological treatment uses filtration (removal) and UV light disinfection.

Figure 1:
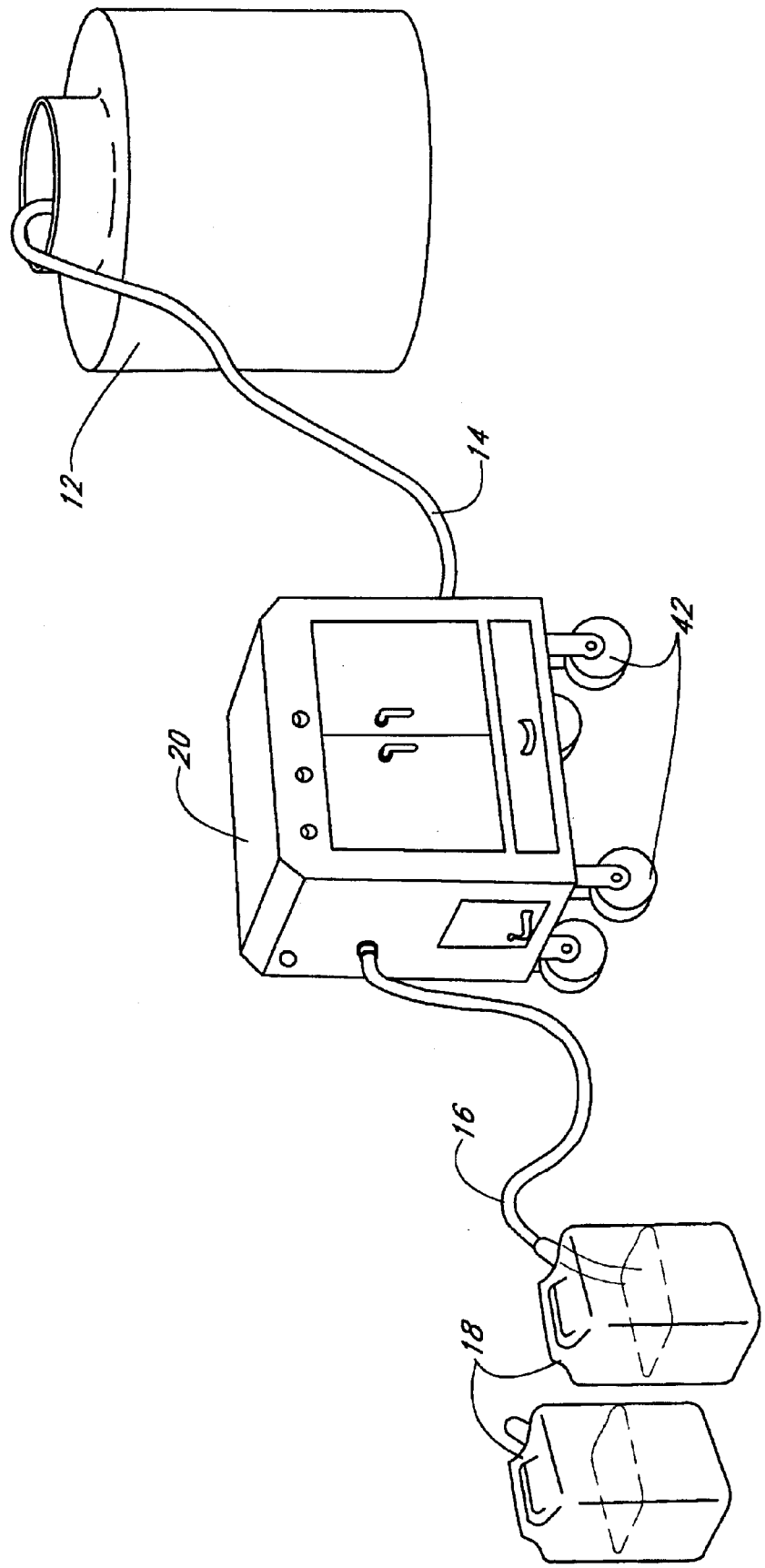
FIG. 1 illustrates the use of a portable water treatment unit having features in accordance with the teachings of the present invention.

FIG. 1 illustrates the use of a water treatment unit 20 having features in accordance with a preferred embodiment of the present invention. The unit 20 can advantageously be used to purify contaminated water, such as water contained within the illustrated storage tank 12. The contaminated water is drawn into the unit 20 in any suitable manner, such as through the illustrated hose 14. The water is treated and then expelled from the unit 20, such as through the illustrated hose 16. The treated water can be delivered directly to the illustrated small storage containers 18 or into a larger storage tank. Alternatively, the treated water can be used immediately after it is expelled from the treatment unit 20. The unit 20 preferably includes wheels 42 for ease of transportation and maneuverability.

Figure 2:
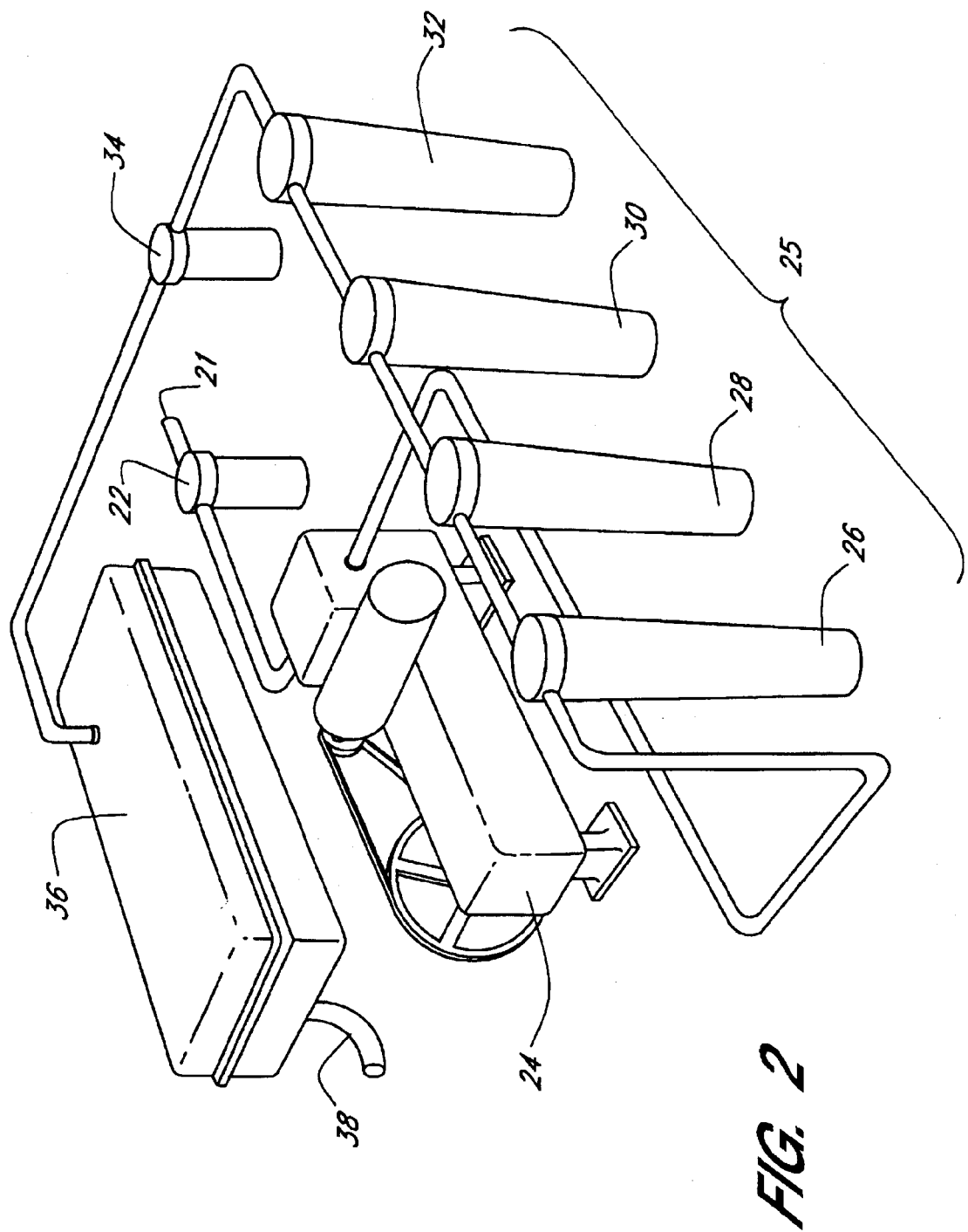
FIG. 2 is a perspective view of the components of a water treatment unit according to a preferred embodiment of the present invention.

FIG. 2 shows the components of a water treatment unit 20 according to a preferred embodiment of the invention. The treatment unit includes a solid or silt separator 22, a pump 24, a series 25 of filters (including the illustrated filters 26, 28, 30, and 32), a flow meter 34, and a UV light disinfection unit 36. Although shown upstream of the pump 24, the solid separator 22 is preferably downstream of the pump. An intake strainer (not shown) is preferably attached to an inlet 21 of the unit 20.

Referring to FIG. 2, in operation of the water treatment unit 20, contaminated water is drawn in through the inlet 21. Relatively large debris is prevented from flowing into the unit 20 by the intake strainer (not shown). The pump 24 forces the water to flow into the solid separator 22 for removal of relatively large solids, such as silt and sand, that pass through the intake strainer. The water then flows through the series of filters 25. Preferably, the filters are arranged from coarsest to finest, such that the first filter of the series 25 removes larger particles from the water, and the downstream filters remove particles of decreasing size. After flowing through the series of filters 25, the water flows through the flow meter 34 and into the UV light disinfection unit 36. Finally, the water flows out of an outlet 38 attached to the UV light disinfection unit 36.

Preferably, the water flow rate into the UV light disinfection unit 36 is limited to ensure adequate UV disinfection. Generally, as the flow rate decreases, the quality of the UV disinfection is enhanced, due to the fact that the water is exposed to the light from the UV lamp for a longer duration and thus receives more UV energy. Therefore, the flow rate is preferably low enough to ensure that the water receives adequate UV light exposure. If desired, a flow-restrictor or flow-limiter may be included upstream of the UV light disinfection unit 36 to ensure that the flow rate is below a certain level.

The pump 24 and the UV light disinfection unit 36 of the water treatment unit 20 can be powered by one or more batteries or by an electrical power supply. The unit 20 preferably has two electrical inlets: one for the UV light disinfection unit 36 and one for the motor of the pump 24.

If desired, on-site generated chlorine from household salt can be incorporated into the system.

The individual components of the water treatment unit 20 are described in further detail as follows:

Intake Strainer

The intake strainer (not shown in FIG. 2) prevents floating debris in contaminated water (e.g., floodwater) from entering the water treatment unit 20. Such floating debris could damage the pump 24 and other components of the unit 20. Any of a variety of different types of strainers can be used, giving due consideration to such goals. One suitable strainer is a swimming pool suction strainer that fits onto the end of the inlet pipe 21. The Mack Iron Works Company, located in Sandusky, Ohio, sells a suitable intake strainer under the product name Tank Suction Strainer. This strainer is made of 305 stainless steel with 16 mesh (1130 $\mu$m) openings with a 2 cm (0.79 inch) line size allowing a flow rate of 15 liters per minute (4 GPM). The pressure drop across the mesh is about 1.2 psi even when it is 80% clogged. As the inflow water will be of highly questionable quality, a stainless steel strainer is preferred over a carbon steel strainer.

Pump

The pump 24 (FIG. 2) preferably supplies sufficient pressure for the water to flow through all of the components of the treatment unit 20. In a preferred embodiment, the UV light disinfection unit 36 is a UV Waterworks™ unit, which disinfects gravity-driven water flow. In this preferred embodiment, the pump 24 supplies sufficient pressure for the water to flow through the solid separator 22 and the series of filters 25, and no pressure is required of the water flowing into the UV light disinfection unit 36. The required pressure rating of the pump 24 is determined by the sum of the maximum operational pressure drops across each of the components of the treatment unit. Table 1 lists the maximum pressure drops for each component of the unit.

TABLE 1

Maximum Pressure Drops of Components of the Water Treatment Unit

| Unit Component | Pressure Drop |
| --- | --- |
| Intake strainer | 1.2 psid (max) |
| Solid separator | 8 psid (constant) |
| Filter | 30–35 psid per filter (maximum allowable, "at end of life") |
| UV light disinfection unit | No pressure required of incoming water |

In the preferred embodiment, three filters and one solid separator are used, and the UV light disinfection unit is gravity-driven and thus does not require any pressure of the incoming water. In this case, in a worst case scenario (i.e., all three filter cartridges clog up simultaneously) the total pressure needed will be 110–120 psi. Thus, the pump 24 is preferably able to supply a pressure of 110–120 psi. However, all three filters are unlikely to clog simultaneously. Therefore, a pump 24 having a pressure output of 80–100 psi ([1.2+8+30]×2 (factor of safety) for a total psi rating) is suitable.

Any of a variety of different types of pumps can be used, giving due consideration to the goals of (1) delivering high enough pressure while the water flow rate is low enough to provide adequate UV disinfection, (2) having the ability to adjust the pressure output (by throttle or variable speed motor) as the filters get plugged up or replaced, and (3) operating with silty or muddy waters. When the filters are clean, the flow is throttled down. When the filters become plugged, the throttle is opened to allow greater flow through the pump 24. Conceivably, a centrifugal pump, a flexible impeller pump, a progressive cavity pump, or a diaphragm pump could be used.

A suitable pump is sold by PACO Pumps of Oakland, Calif., product number D10/LBNSHHE. This is a high pressure, heavy duty, diaphragm-type positive displacement pump rated for 15 liters per minute (4 GPM) and having a maximum pressure rating of 200 psi with a stainless steel pressure regulating valve. Made with a lead-free, brass pumping head, and EPDM food grade elastomers, this pump is suitable for drinking water. The pump is powered by a 737 W (1 horsepower), 1750 RPM, 208 volt AC, electric motor. The pump can be directly connected to the motor by a flexible coupling. In a preferred embodiment, the 208 VAC motor is replaced with a 110 VAC motor, to reduce the overall weight of the treatment unit. Together, this preferred pump and motor weigh 50 kg (105 lbs). Alternatively, a pump with a pressure rating on the order of 100 psi can be used, as the 200 psi pump will work at half capacity most of the time.

If desired, a second pump can be connected to an equally powerful 12 volt (1 HP) DC motor. Alternatively, a small gasoline generator can be used to power both the motor for the pump 24 and the UV light disinfection unit 36. Further, the pump 24 may tend to vibrate, which can disturb the pressure gages and the water surface inside the UV light disinfection unit 36. A damping device may be included to reduce the undesired effects of vibration.

Solid Separator

With reference to FIG. 2, the effect of the solid separator 22 is to remove generally larger particles or coarse sediment loads from the water. The solid separator 22 is to be distinguished from the filters 25 by the fact that large particles are diverted into a sediment trap that can be purged continuously or intermittently, rather than staying in the flow path and blocking flow. A preferred solid separator is a "hydrocyclonic separator," or "hydrocyclone," which operates upon the principle of centrifugal separation. A suitable hydrocyclone is sold by Lakos Filtration Systems of Fresno, Calif., under the product name IL-0037 Lakos carbon steel separator. This hydrocyclone removes particles denser than water and most particles larger than 74 $\mu$m. This protects the filter cartridges downstream, cutting cartridge replacements by 20–80%. In use of the treatment unit, the degree to which the solid separator 22 is needed will depend upon the placement of the intake hose, as this class size of particles may be eliminated from the influent water simply by appropriate intake hose placement in quiescent waters.

Using a hydrocyclone instead of a 50 or 60 $\mu$m filter offers several advantages. The hydrocyclone can handle a wider range of suspended solids. Although the pressure drop (approximately 8 psid) is higher than that for a clean filter, (for which it is usually less than 1 psid), the pressure drop remains constant. There is no need to monitor the pressure drop across the hydrocyclone, thus eliminating the need for an additional pressure gage. Required maintenance is minimal, as there are no moving parts to wear out, and no filter elements to clog. Reduced maintenance requirements saves labor, reduces downtime, and eliminates ordering and stocking spare parts. The unit is designed to operate continuously without any shutdowns for cleaning or maintenance, and the separated solids can either be purged continuously or intermittently during fall operation with no loss of performance.

Filters

Referring to FIG. 2, the series 25 of filters may include any number of filters of various types. In a preferred embodiment, there are three filtration stages, each corresponding to a different particle size. The three filter sizes are chosen based upon publicly available information regarding particle size distributions in municipal wastewater, which indicates one peak grouping at approximately 30 $\mu$m and a second grouping at less than 1 $\mu$m. Thus, it is preferred to include three filters 26, 28, and 30 (FIG. 2), having ratings of 30 $\mu$m, 10 $\mu$m, and 1 $\mu$m, respectively. In addition, a carbon filter 32 (such as a GAC filter or a block filter), a KDF filter, and/or a nitrate filter are most preferably included in addition to or in place of one or more of the physical filters 26, 28, 30. Advantageously, carbon filters adsorb odor-causing contamination, the KDF filter retains heavy metal, and ion exchange resins are arranged to remove nitrates.

In the preferred embodiment, the filters are pleated depth filters, about 20 inches in length, formed of polypropylene and having double open-end configurations. Such filters have larger and better dirt-holding capacity compared to other types. Other types of filters can be used, such as bag filters, depth, wound, and surface filter cartridges. Pleated depth filters are preferred primarily because they are smaller and weigh less. For example, suitable bag filters weigh approximately 70–80 lbs and are 44 inches in length. In addition, replacing a bag filter requires the removal of an approximately 30 inch long basket, which necessitates sufficient space for maneuverability and, hence, increases the size of the treatment unit 20. Finally, the bag filters and their housings are more expensive.

The filters are preferably absolute rated, rather than nominal. Thus, filter 26, which in the preferred embodiment is rated at 30 μm, retains 100% of particles 30 μm or larger and 90% of particles larger than 16 μm. Filter 28, which in the preferred embodiment is rated at 10 μm, retains 100% of particles 10 μm or larger and 90% of particles larger than 7.5 μm. Filter 28 protects filter 30 (rated at 1 μm) from large-diameter particle loadings, which would reduce the efficiency of filter 30. Filter 30 removes large organisms such as Cryptosporidium and Giardia cysts, which the UV light disinfection unit 36 may not provide a high enough UV dose to kill. Together, the filters 25 preferably remove particles down to about 1 μm (0.001 mm). The UV light disinfection unit 36 treats the biological contaminants that remain. Preferably, all materials used in the filters comply with FDA regulations as well as satisfy the requirements of current USP Class VI Biological Tests for Plastics. Further, the filter 30, which in the preferred embodiment is rated at 1 μm, is preferably validated per NSF Standard 53 as an absolute barrier to Cryptosporidium.

Meisner Filtration Products, located in Camarillo, Calif., sells Alpha filter cartridges that are suitable for the purposes of the present invention. These filter cartridges are designed to withstand differential pressures up to 75 psi, although it is recommended practice to replace the cartridges once the pressure drop reaches 30 psid. AMETEK Filter Housings, located in Santa Clara, Calif., sells standard polypropylene filter housings that are suitable for the purposes of the present invention. These housings are rated to withstand a maximum static pressure of up to 150 psi.

Pressure and Flow Sensors

Filters require constant monitoring to maintain the performance levels guaranteed by the manufacturer. As filters get clogged, the pressure drop across each filter increases. As a result, the pump 24 would need to deliver increasingly higher pressure to maintain a constant flow rate of water through the filters. However, over-pressurization can cause a filter to tear. Thus, it is preferred to monitor the pressure drop across each filter. The monitoring is best done by a differential pressure gage. Filters without gages typically are replaced either too soon or too late, resulting in excess expense or potential product malfunction.

Any of a variety of different types of pressure gauges can be used, keeping in mind the goals of accuracy and low weight. In one embodiment, three separate conventional "Magnehelic" differential pressure gages are used. In a cheaper and lighter alternative embodiment, simple differential pressure gauges are used, which qualitatively indicate the pressure drop across each filter element. Such pressure gages can be purchased from Differential Pressure Plus, located in Danbury, Conn., under the product name Model DPP-975 differential pressure gage. A dial on each gage is divided into three sections to indicate filter condition. The three pressure ranges are color marked as green, yellow, and red to represent the pressure ranges 0–10, 10–20, and 30–50 psid, respectively. The pressure gauges can be mounted with mounting blocks, which are generally available from the gauge manufacturer. Pressure and elapsed time indicators alert the user when cartridges should be manually replaced.

The pressure gages are preferably calibrated. To calibrate these gages, a regular Capsuhelic differential pressure gage can be included in the system. Dwyer Instruments Inc., located in Anaheim, Calif., sells a Capsuhelic differential pressure gage suitable for the purposes of this invention. The Capsuhelic pressure gage may be plumbed with several tubing pieces and ball valves so that it can measure the pressure drop across each of the filters 25 by activating the appropriate ball valves as a redundancy measure. The ball valves can be numbered so that the accuracy of each of the lighter pressure gages can be easily verified by comparison with the more reliable Capsuhelic pressure gage.

Referring to FIG. 2, the flow meter 34 is included downstream of the last filter and upstream of the UV light disinfection unit 36, for monitoring the flow into the disinfection unit 36. In the preferred embodiment, acceptable flow into the UV light disinfection unit 36 is 15 liters per minute (4 GPM). A pressure relief valve and gate valve can be mounted downstream of the pump 24, and can be adjusted to maintain the required flow rate. In one embodiment, the flow meter 34 comprises a rotameter.

A control panel and electronics allow for semi-automated control and easy switching from AC or DC power supplies. Preferably, the control panel reads signals from fluid level indicators (e.g., float sensors) and/or readings from the flow meter 34 to automatically start and stop the flow of water according to demand and to ensure that water does not overflow the tray in the UV Waterworks™ through which water flows at atmospheric pressure under the influence of gravity.

UV Light Disinfection Unit

The UV light disinfection unit 36 treats the water stream by emitting UV light onto the water as it flows through the unit 36. Preferably, the unit 36 emits UV light in the wavelength range 240 to 280 nanometers (nm), which is known to be germicidal. The UV exposure causes adjacent bases in the DNA to covalently bond together, thus disabling it from replication. Preferably, the unit 36 includes a low-pressure mercury arc (the same as that used inside ordinary kitchen fluorescent lamps), which puts out 95% of its energy at 254 nanometers and is thus an extremely efficient germicidal UV source.

In a preferred embodiment, the UV light disinfection unit 36 comprises a UV Waterworks™ unit, as described by Gadgil '860. The UV Waterworks™ unit includes a linear UV lamp positioned horizontally below a semi-cylindrical polished aluminum reflector, suspended above the free surface of water flowing in a shallow stainless steel tray. This design innovation circumvents the problem of chemical- and bio-fouling of the solid surface between the UV source and the water by eliminating any such surface. Also, since the flow resistance is small, water with pressure of only a few centimeters of water column can flow through the device. The UV Waterworks™ unit consumes 60 watts of electricity, disinfects just under 1 ton of water per hour (15 lpm, more than twice the flow rate through an average U.S. bathtub faucet) by delivering it a UV energy dose of up to 110,000 microwatt-seconds/cm$^2$ in 10–12 seconds, and accepts atmospheric-pressure raw water (e.g., poured from a hand-carried pot). In the emergency relief system, therefore, water is gravity-driven through the UV disinfection unit, rather than pressurized. The UV Waterworks™ unit is sold by Waterhealth International, Inc., located in Napa, Calif.

Portable Cart

Figure 3:
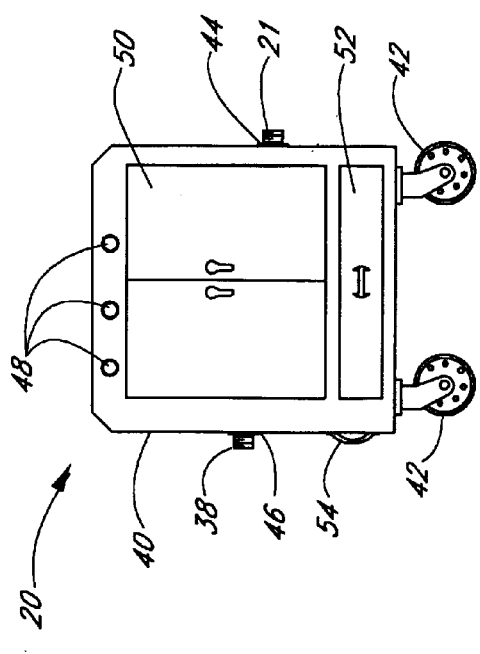
FIG. 3 is a front view of a portable water treatment unit according to a preferred embodiment of the present invention.

FIGS. 3–6 show a preferred embodiment of a portable water treatment unit 20 of the present invention. Referring initially to FIG. 3, the treatment unit 20 includes the water treatment unit components shown in FIG. 2 provided on or within a cart 40. In the illustrated embodiment, the cart 40 includes wheels 42 for rolling the cart. An opening 44 in the cart 40 receives the water inlet pipe 21 of the treatment unit 20, and an opening 46 receives the water outlet pipe 38. The pressure gages 48 for the filters are mounted near the top of the cart 40. The cart 40 includes two large doors 50 that can be opened to permit access to the unit for replacement of the filters. Also, a storage compartment 52 may be provided for storing extra filter cartridges or other items.

Figure 4:
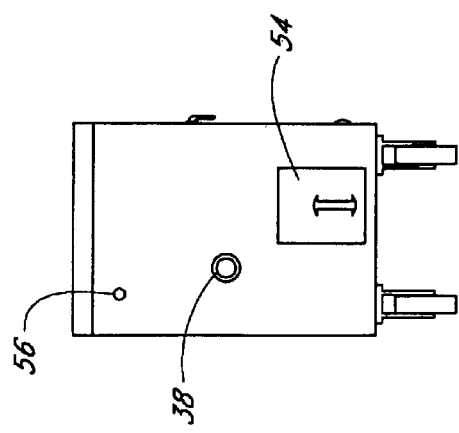
FIG. 4 is a left side view of the water treatment unit of FIG. 3.
Figure 5:
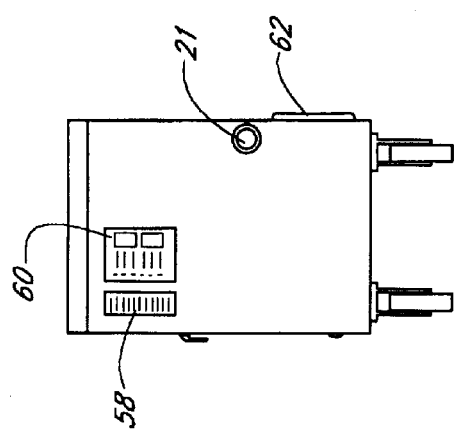
FIG. 5 is a right side view of the water treatment unit of FIG. 3.
Figure 6:
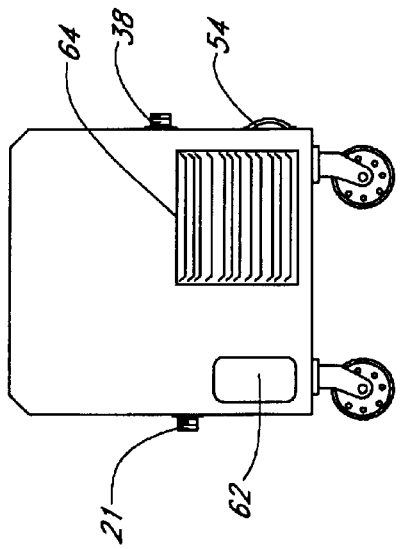
FIG. 6 is a rear view of the water treatment unit of FIG. 3.

With reference to FIG. 4, the cart 40 includes a door 54 that can be opened to permit access to a battery compartment and/or power cord in the cart 40. The door 54 permits replacement of the batteries, and also direct connection of the power cord to an external power supply. The cart 40 includes a window 56 that permits viewing of the UV light disinfection unit 36. With reference to FIG. 5, the cart 40 includes a window 58 that permits viewing of the flow meter 34. A control panel 60 on the cart 40 permits control of the pump 24 and the UV light disinfection unit 36. With reference to FIG. 6, the cart 40 includes a window 62 that permits viewing of the solid separator 22, and a vent 64.

The cart 40 can be formed from any suitable materials, but is desirably formed from engineering plastics, for lighter weight. The piping from the pump 24 to the gate valve to the solid separator 22 may comprise galvanized steel pipes to withstand high pressure. The remainder of the piping can comprise Schedule 40 PVC pipe with union couplings wherever necessary through the flow meter 34 and a clamped flexible hose to the UV light disinfection unit 36.

Prototype Water Treatment Unit Performance

A laboratory prototype of the herein described water treatment unit 20 was created and tested. To test the sediment removal capability of the treatment unit 20, turbidity was used as an indicator of sediment load. Isofine test dust, 12103-1, A2 (obtained from Powder Technologies, Inc., located in Brunsville, Minn.) was used to generate artificial turbidity. The turbidity was measured using a standardized nephelometer (Monotech, Model 21). Table 2 shows the inflow and outflow values for turbidity during testing of the treatment unit 20. Approximately 65 liters of test water was prepared for each challenge. The pressure drop across the filters was still negligible at the end of this round of testing.

TABLE 2

Inlet and Outlet Turbidities of Water Flowing through the Treatment Unit

| Inlet Turbidity | Outlet Turbidity |
| --- | --- |
| 15 NTU | <0.4 NTU |
| 30 NTU | <0.4 NTU |
| 50 NTU | <0.4 NTU |
| 150 NTU | 7–8 NTU |

To test the treatment of biological loads, coliform organisms were used as an indicator of biological disinfection performance. The system performance was tested with water comprising 1% settled raw sewage from a local municipal wastewater treatment plant and 99% dechlorinated local tap water. Influent total coliform concentrations of 100,000–1,000,000 colony forming units (CFUs) per 100 ml were reduced to less than 1 CFU per 100 ml, indicating a reduction of at least 5–6 logs.

The prototype water treatment unit that has been built occupies about one cubic meter of space, weighs about 130 kg (290 lbs), and can provide up to 15 liters/minute or 20,000 liters (5000 gallons) of drinking water (150 times its own weight) per day. The prototype unit was constructed with readily available, easy to assemble parts. With custom made fittings, the treatment unit (excluding batteries) will weigh less than 100 kg (220 lbs) and occupy a volume of less than approximately one cubic meter (30 cubic feet). In another embodiment, the entire water treatment unit 20 (including batteries, framework, and dolly) weighs less than 100 kg.

The prototype treatment unit has successfully treated waters with up to 100 NTUs of turbidity and contaminated with 1% secondary sewage effluent. The prototype includes three particle filters having ratings of 30 $\mu$m, 10 $\mu$m, and 1 $\mu$m.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Further, the various features of this invention can be used alone, or in combination with other features of this invention other than as expressly described above. Thus, it is intended that the scope of the present invention herein disclosed should not be limited by the particular disclosed embodiments described above, but should be determined only by a fair reading of the claims that follow.

What is claimed is:

1. A portable water purification system configured to purify water, comprising:
   an inlet configured to receive water;
   a solid separator connected so as to receive water that has flown through said inlet, said solid separator configured to separate solids from water flowing therethrough;
   at least one filter, said at least one filter connected downstream of said solid separator; and
   an ultraviolet disinfection unit connected downstream of said at least one filter, said ultraviolet disinfection unit configured to treat water flowing through said ultraviolet disinfection unit by irradiating the water with ultraviolet light;
   wherein said water treatment unit weighs 130 kg or less.

2. The water purification system of claim 1, capable of purifying water at a rate of at least about 15 L/min.

3. The water purification system of claim 2, capable of purifying water at a rate of at least about 20,000 L/day.

4. The water purification system of claim 2, capable of purifying inlet water with coliform concentration between about 100,000 to 1,000,000 CFU per 100 mL to outlet water with less than about 1 CFU per 100 mL.

5. The water purification system of claim 1, further comprising a pump configured to pump water through said system.

6. The water purification system of claim 1, wherein said solid separator comprises a hydrocyclone.

7. The water purification system of claim 1, wherein said ultraviolet light disinfection unit is gravity-driven.

8. The water purification system of claim 1, wherein said at least one filter comprises two or more filters connected in series.

9. The water purification system of claim 1, wherein said at least one filter removes particles down to about 1 $\mu$m from flowing water.

10. The water purification system of claim 9, wherein said at least one filter comprises:
   a first filter configured to remove particles of approximately 30 $\mu$m or greater from water flowing through said first filter;
   a second filter configured to remove particles of approximately 10 $\mu$m or greater from water flowing through said second filter; and a third filter configured to remove particles of approximately 1 μm or greater from water flowing through said third filter.

11. The water purification system of claim 1, further comprising a cart configured to support at least said solid separator, said at least one filter, and said ultraviolet disinfection unit, said cart having wheels to permit rolling of said cart.

12. The water purification system of claim 1, capable of purifying water at a rate of at least about 15 L/min.

13. The water purification system of claim 1, wherein the water purification system weighs 100 kg or less.

14. The water purification system of claim 13, further comprising a battery for powering a pump.

15. A portable water purification system configured to purify water, comprising:
- an inlet configured to receive water;
- a solid separator connected so as to receive water that has flown through said inlet, said solid separator configured to separate solids from water flowing therethrough;
- at least one filter, said at least one filter connected downstream of said solid separator; and
- an ultraviolet disinfection unit connected downstream of said at least one filter, said ultraviolet disinfection unit configured to treat water flowing through said ultraviolet disinfection unit by irradiating the water with ultraviolet light, wherein said ultraviolet disinfection unit is gravity driven and comprises:
  - a tray configured to contain water flowing through said ultraviolet disinfection unit; and
  - a UV lamp positioned above said tray, said lamp configured to emit UV light directly onto a free surface of water flowing in said tray.

16. A water treatment unit configured to purify water, comprising:
- an inlet configured to receive water;
- a pump capable for driving water through the unit;
- a solid separator connected so as to receive water that has flown through said inlet, said solid separator configured to separate solids from water flowing through said solid separator, wherein said solid separator comprises a hydrocyclone; and
- an ultraviolet disinfection unit connected so as to receive water that has flown through said solid separator, said ultraviolet disinfection unit configured to treat the water by emitting ultraviolet light onto the water;
- wherein said water treatment unit weighs 100 kg or less.

17. The water treatment unit of claim 16, capable of purifying water at a rate of at least about 15 L/min.

18. The water treatment unit of claim 16, further comprising a cart configured to support at least said solid separator and said ultraviolet disinfection unit, said cart having wheels to support rolling of said cart.

19. The water treatment unit of claim 16, further comprising at least one filter, said at least one filter connected so as to receive water that has flown through said solid separator, said ultraviolet disinfection unit connected so as to receive water that has flown through said at least one filter.

20. The water treatment unit of claim 19, wherein said at least one filter removes particles down to about 1 μm from flowing water.

21. The water treatment unit of claim 19, wherein said at least one filter comprises at least one chemical filter.

22. The water treatment unit of claim 21, wherein said at least one chemical filter comprises at least one of a carbon filter, an ion exchange filter and a heavy metal filter.

23. The water treatment unit of claim 16, capable of purifying each day water having a weight greater than about 150 times the water treatment unit weight.

24. The water treatment unit of claim 16, wherein said pump has an output pressure between about 80 psi and 120 psi.

25. A water treatment unit configured to purify water, comprising:
- an inlet configured to receive water;
- a pump capable for driving water through the unit;
- a solid separator connected so as to receive water that has flown through said inlet, said solid separator configured to separate solids from water flowing through said solid separator; and
- an ultraviolet disinfection unit connected so as to receive water that has blown through said solid separator, said ultraviolet disinfection unit configured to treat the water by emitting ultraviolet light onto the water;
- wherein said water treatment unit weighs 100 kg or less.

26. A method of purifying water, comprising:
- providing a flow of water to be purified;
- directing said flow of water through a solid separator configured to separate solids from said flow of water;
- directing said flow of water through a plurality of filters connected in series, said filters being arranged from coarsest to finest; and
- directing said flow of water through a gravity-driven UV disinfector configured to emit UV light onto said flow of water, wherein directing said flow of water through a UV disinfector comprises directing said flow onto a tray, wherein a UV lamp is positioned above said tray, said lamp configured to emit UV light directly onto the free surface of water flowing in said tray.

27. A method of purifying water, comprising:
- providing a flow of water to be purified;
- directing said flow of water through a solid separator configured to separate solids from said flow of water, wherein said solid separator comprises a hydrocyclone;
- directing said flow of water through a plurality of filters connected in series, said filters being arranged from coarsest to finest; and
- directing said flow of water through a gravity-driven UV disinfector configured to emit UV light onto said flow of water.

28. The method of claim 27, wherein said plurality of filters comprises:
- a first filter configured to remove particles having an average diameter of approximately 30 μm or greater from water flowing through said first filter;
- a second filter configured to remove particles having an average diameter of approximately 10 μm or greater from water flowing through said second filter; and
- a third filter configured to remove particles having an average diameter of approximately 1 μm or greater from water flowing through said third filter.

29. The method of claim 27, conducted through a unit having a weight less than about 130 kg.

30. The method of claim 27, further comprising directing said flow of water through a pump configured to force said water to flow through said solid separator and said plurality of filters.

31. The method of claim 27, further comprising moving said solid separator, said plurality of filters, and said UV disinfector.

32. The method of claim 31, wherein moving comprises moving said solid separator, said plurality of filters, and said UV disinfector in unison.

33. The method of claim 27, wherein said solid separator, said plurality of filters, and said UV disinfector are supported on or within a cart having wheels for rolling said cart on a lower support surface, the method further comprising moving said cart.

34. The method of claim 27, wherein providing a flow comprises pumping at a rate of at least about 15 L/min.

35. The method of claim 34, wherein water entering the solid separator has a coliform concentration of 100,000 CFUs per 100 mL to 1,000,000 CFUs per 100 mL.

* * * * *

UNITED STATES PATENT AND TRADEMARK OFFICE
CERTIFICATE OF CORRECTION

PATENT NO.  : 6,464,884 B1
DATED       : October 15, 2002
INVENTOR(S) : Gadgil et al.

It is certified that error appears in the above-identified patent and that said Letters Patent is hereby corrected as shown below:

Column 12,
Line 17, delete "blown" and insert therefor -- flown --.

Signed and Sealed this

Tenth Day of June, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,464,884 B1
DATED : October 15, 2002
INVENTOR(S) : Ashok J. Gadgil It is certified that error appears in the above-identified patent and that said Letters Patent is hereby corrected as shown below:

<u>Column 1,</u>
Line 10, insert the following:
-- STATEMENT OF GOVERNMENTAL SUPPORT The invention described and claimed herein was made in part utilizing funds supplied by the U.S. Department of Energy under Contract No. DE-AC03-76SF00098. The government has certain rights in this invention. --.

Signed and Sealed this

Sixth Day of June, 2006

JON W. DUDAS
*Director of the United States Patent and Trademark Office*